United States Patent [19]
Woolfolk, Sr.

[11] 3,967,694
[45] July 6, 1976

[54] PORTABLE SURF FISHING PLATFORM

[76] Inventor: Martin Y. Woolfolk, Sr., 3840 Cherry St., Zachary, La. 70791

[22] Filed: Aug. 8, 1974

[21] Appl. No.: 495,920

[52] U.S. Cl. .................. 182/82; 182/115; 182/108; 182/112; 297/217
[51] Int. Cl.² .................................................. A47C 7/62
[58] Field of Search .......... 182/107, 108, 115, 129, 182/20, 118, 141, 82, 179, 178, 112; 297/217

[56] References Cited
UNITED STATES PATENTS

| | | | |
|---|---|---|---|
| 1,225,448 | 5/1917 | Lusardi | 52/157 |
| 2,177,677 | 10/1939 | Staben | 182/108 |
| 2,643,843 | 6/1953 | Brown | 52/157 |
| 2,962,112 | 11/1960 | Ramsberger | 182/107 |
| 3,220,766 | 11/1965 | Kates | 182/20 |
| 3,289,787 | 12/1966 | McSwain | 182/20 |
| 3,419,108 | 12/1968 | Mobbs | 182/152 |
| 3,472,339 | 10/1969 | Herrera | 182/129 |

FOREIGN PATENTS OR APPLICATIONS

| | | | |
|---|---|---|---|
| 865,044 | 4/1961 | United Kingdom | 52/157 |

Primary Examiner—Reinaldo P. Machado
Attorney, Agent, or Firm—Clarence A. O'Brien; Harvey B. Jacobson

[57] ABSTRACT

A collapsible platform adapted to be erected in shallow water for surf fishing. Bearing plates connected to the lower ends of extensible legs stabilize a support panel to which a folding chair is hingedly connected. The platform is anchored in place by a handle operated actuating rod connected to a screw element adapted to penetrate the supporting sand formation below the water surface.

10 Claims, 7 Drawing Figures

U.S. Patent  July 6, 1976  Sheet 3 of 3  3,967,694
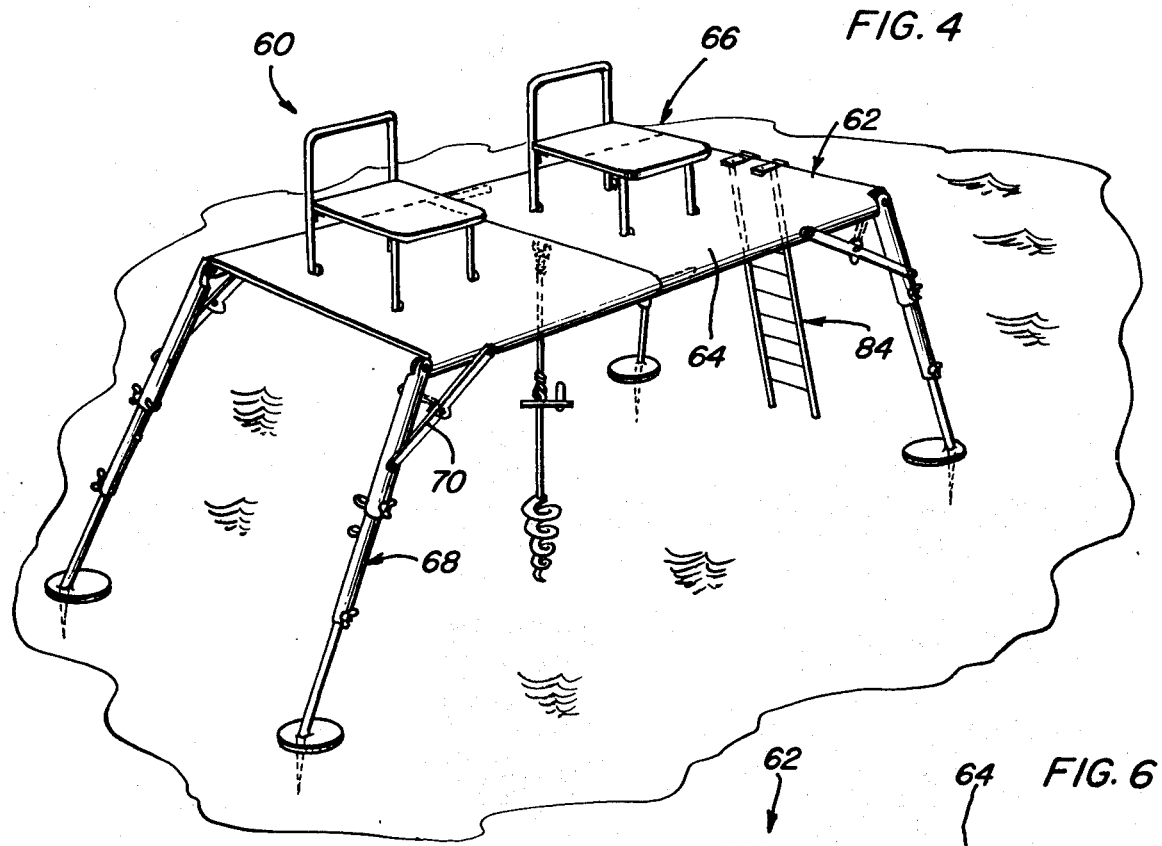
FIG. 4
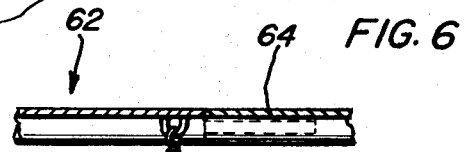
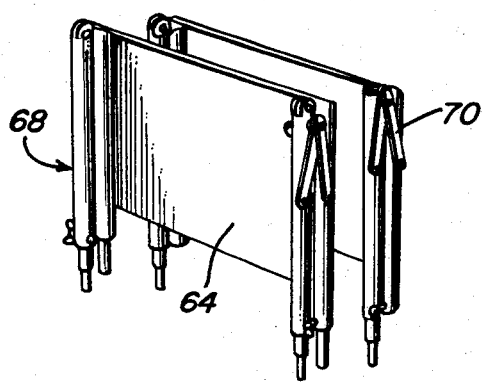
FIG. 5
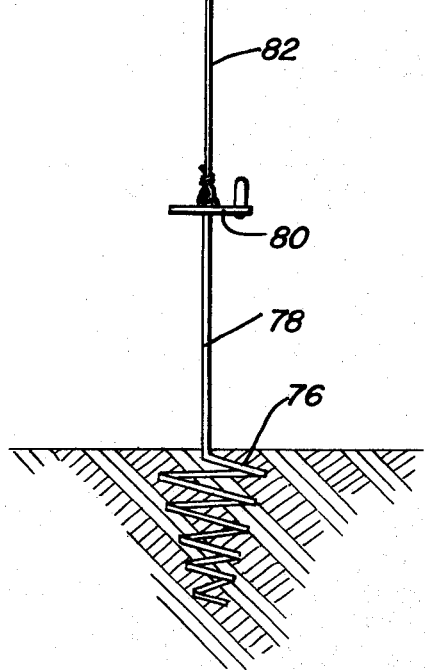
FIG. 6
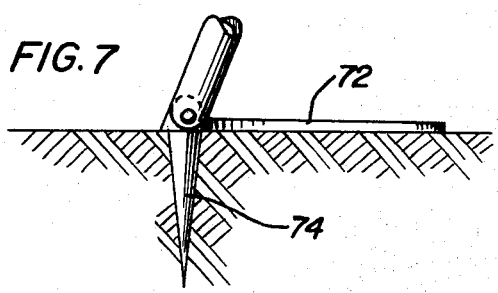
FIG. 7

PORTABLE SURF FISHING PLATFORM

This invention relates to a collapsible and portable platform structure specifically adapted for surf fishing purposes.

Various portable or collapsible platform structures have been devised for sportsmen desirous of having an elevated position at a suitable location. Generally, such platform structures are designed for being positioned on dry land. It is therefore an important object of the present invention to provide a portable platform structure which is particularly suitable for anchoring in shallow water in order to provide a sportsman with a vantage point from which surf fishing may be engaged in.

Prior art structures of which applicant is aware, are disclosed in U.S. Pat. Nos. 967,803, 3,181,649, 3,220,766, 3,250,344, 3,289,787, 3,406,784, 3,432,003, and 3,722,621.

In accordance with the present invention, a platform is supported at an elevated position above the surface of water at a beach for example, by at least three extensible leg assemblies hinged to the underside of the platform support to which at least one folding chair is pivotally connected. Bearing plates are connected to the lower ends of the extensible leg assemblies for contact with the sand and thereby stabilize the platform support in a horizontal position by resisting sinking of the leg assemblies into the sand. Anchor points may extend from the bearing plates into the sand in order to prevent horizontal shift while the entire platform structure may be firmly anchored at the desired location by an anchoring screw threadedly extended into the sand formation by an actuating rod connected thereto to which a handle is pivotally connected within easy reach of a sportsman on the support platform. In one embodiment of the invention, the screw elements are rotatably mounted by the bearing plates while in another embodiment the screw element and actuating rod is suspended from the underside of the platform support between the leg assemblies.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 4 is a perspective view of another form of platform structure shown in an erected condition.

FIG. 5 is a perspective view showing the platform structure of FIG. 4 in a collapsed condition.

FIG. 6 is a partial side sectional view of a portion of the structure shown in FIG. 4.

FIG. 7 is a partial side elevational view of the structure shown in FIG. 4.

Figure 1:
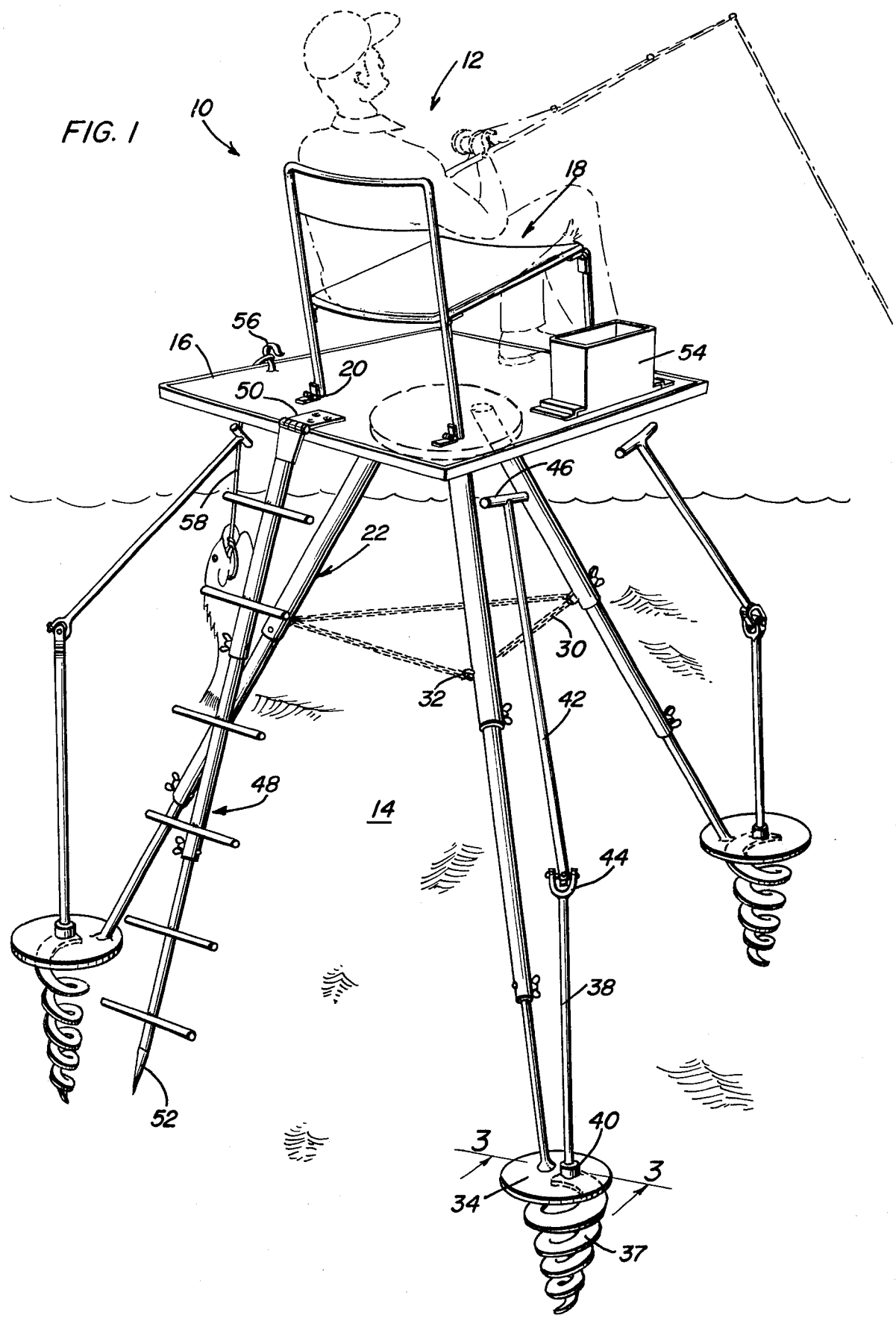
FIG. 1 is a perspective view showing the erected platform structure in accordance with the present invention.
Figure 2:
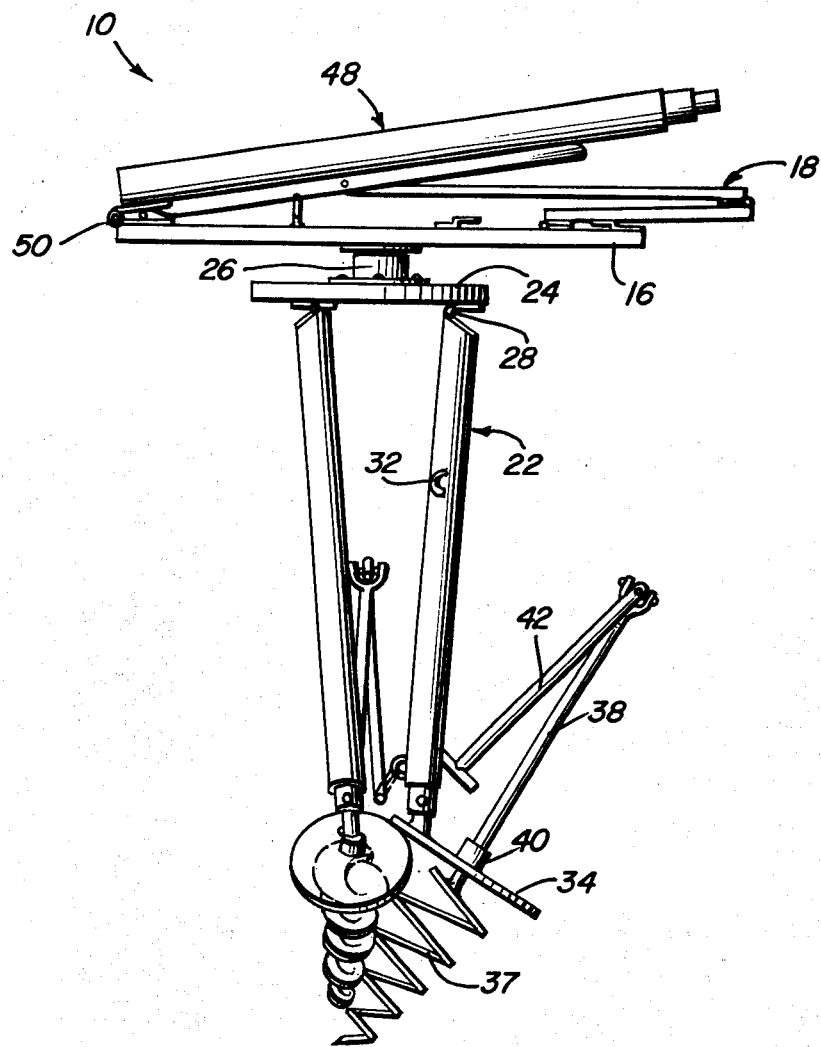
FIG. 2 is a side elevational view showing the structure of FIG. 1 in a collapsed condition.

Referring now to the drawings in detail, FIG. 1 illustrates an erected platform structure constructed in accordance with the present invention and generally denoted by reference numeral 10. This structure is adapted to be collapsed and thereby made portable as shown in FIG. 2. The platform structure as shown in FIG. 1 is adapted to support a sportsman 12 in a position elevated above the surface of shallow water 14, from which position the sportsman may engage in surf fishing. The platform structure includes a horizontal support panel 16 to which a folding chair 18 is pivotally connected by means of hinges 20 at the bottom of the chair legs. The support panel 16 is supported in its elevated position by at least three extensible leg assemblies 22 forming a tripod arrangement in the embodiment illustrated in FIG. 1. These leg assemblies are connected to the support panel 16 in this embodiment through a turntable base 24 mounting a swivel pivot assembly 26 to which the support panel 16 is connected for rotation about a vertical axis. Any suitable lock mechanism (not shown) may releasably hold the support panel 16 in any desired angular position relative to the leg assemblies 22 which are pivotally connected by hinges 28 to the turntable base 24 as more clearly seen in FIG. 2.

Figure 3:
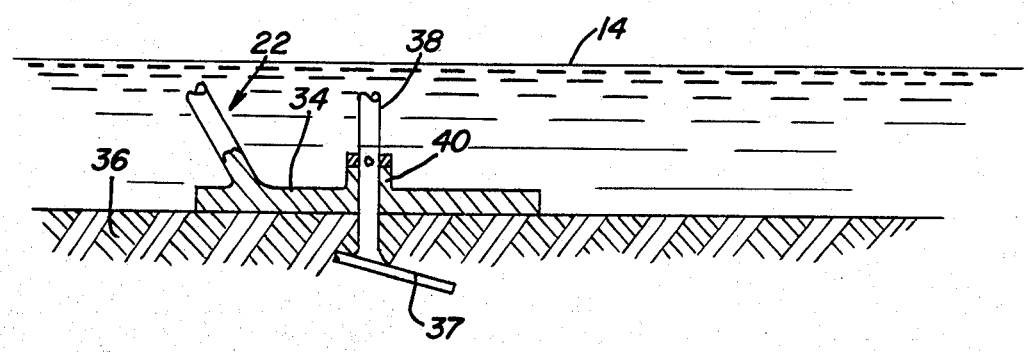
FIG. 3 is an enlarged partial sectional view taken substantially through a plane indicated by section line 3—3 in FIG. 1.

The extensible leg assemblies 22 when extended to a desired length and unfolded from the position shown in FIG. 2, will extend at a predetermined angle from the turntable base 24 and may be interconnected in these positions by a chain 30 extending through the guide loops 32 as shown in FIG. 1. The lower ends of the extensible leg assemblies are connected to bearing plates 34 disposed in parallel spaced relationship to the support panel 16 in order to contact the sandy formation 36 below the surface of the water 14 as more clearly seen in FIG. 3.

In order to anchor the entire platform structure 10 at a desired location, in the embodiment illustrated in FIG. 1, a downwardly converging anchoring screw element 37 is rotatably mounted by each of the bearing plates 34 and is adapted to be threadedly inserted into the sandy formation 36 or withdrawn therefrom by means of an actuating rod 38 that extends upwardly from the screw element through the bearing plate 34 and is rotatable about a vertical axis. A sleeve bearing formation 40 is formed on each of the bearing plates in order to establish a rotatable axis for the actuating rod 34 perpendicular to the plane of the bearing plate as compared to the angular relationship of the leg assembly 22 that extends upwardly therefrom in radially spaced relationship to the bearing sleeve formation 40. An elongated handle rod 42 is connected by means of the pivot 44 to the upper end of the actuating rod 38. The upper end of each of the handle rods 42 is provided with a handgrip 46 within easy reach of the sportsman seated on top of the support panel 16. Thus, the sportsman may periodically re-establish a more firm anchoring of the platform assembly in the sandy formation by rotation of the screw elements 37.

Access to the support panel 16 from below is established by means of an extensible ladder assembly generally referred to by reference numeral 48 as shown in FIG. 1. The upper end of the ladder assembly is pivotally connected by a hinge assembly 50 to the support panel 16 while the lower end of the ladder assembly is provided with a point 52 so that it may be firmly embedded in the sand.

Other items may be mounted on the support panel 16 for the convenience of the sportsman in addition to the folding chair 18. For example, a bait box 54 is shown mounted on the support panel alongside of the chair on one side while a hook 56 is fixed to the support panel on the other side adjacent an edge from which a fish stringer 58 extends downwardly.

Another form of platform structure 60 is shown in FIG. 4 wherein the platform support panel 62 is formed from two hinged sections 64. A folding chair 66 may be hinged to each of the panel sections 64 while an extensible leg assembly 68 is pivotally connected to each of the corners of the support panel 62. Folding braces 70 are pivotally interconnected between each of the leg assemblies and the panel section 64 as shown in FIG. 4. The foregoing assembly may be collapsed in a folded condition as shown in FIG. 5 in order to render the platform structure portable.

The lower end of each extensible leg assembly 68 is pivotally connected to a bearing plate 72 as more clearly seen in FIG. 7 having a spike or anchoring pin 74 connected thereto. The bearing plates 72 will therefore stabilize the erected platform and establish anchor points for the lower ends of the leg assemblies.

In order to anchor the entire platform structure, an anchoring screw element 76 is threadedly inserted into the sandy formation centrally below the unfolded panel assembly 62 by means of an actuating rod 78 having a crank handle 80 connected to its upper end. The crank handle is suspended from the underside of one of the panels 64 by means of a flexible cable 82 as more clearly seen in FIG. 6. Thus, a single anchoring assembly is utilized in the embodiment illustrated in FIGS. 4 through 7 as compared to several anchoring assemblies respectively associated with each of the leg assemblies in the embodiment shown in FIGS. 1 through 3. A ladder assembly 84 is hingedly connected to one of the horizontal support panel sections 64 in the embodiment shown in FIG. 4 in order to provide access to and from the elevated platform panel assembly 62.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable platform adapted to be installed in shallow water for surf fishing purposes, comprising a substantially horizontal support, at least three extensible leg assemblies pivotally connected to said support, means connected to said leg assemblies for holding the same in predetermined angular relation to the support, a plurality of bearing plates respectively connected to said leg assemblies in parallel spaced relation to the support, means for anchoring the support, and actuating means connected to the anchoring means and manually operable from the support for embedding the anchoring means in a sandy surface formation below the water, said actuating means including an elongated actuating rod connected to the anchoring means and handle means pivotally connected to the actuating rod above the water for threadedly inserting or withdrawing the anchoring means into or from the sandy surface formation.

2. The combination of claim 1 including at least one folding chair hingedly connected to the support.

3. The combination of claim 2 wherein said support includes a base to which the leg assemblies are pivotally connected, a turntable, and swivel means mounting the turntable on the base for rotation about a vertical axis.

4. The combination of claim 1 including flexible means suspending the anchoring means from the support.

5. The combination of claim 2 wherein said support includes a base to which the leg assemblies are pivotally connected, a turntable on which the chair is supported, and swivel means mounting the turntable on the base for rotation about a vertical axis.

6. The combination of claim 1 including an anchor pin connected to each of the bearing plates and adapted to be embedded in the sandy formation, and means hingedly connecting said bearing plates to the leg assemblies.

7. The combination of claim 1 including means for rotatably mounting said anchoring means on at least one of the bearing plates.

8. The combination of claim 1 wherein said anchoring means includes a downwardly converging screw element rotatably mounted by at least one of the bearing plates.

9. A portable platform adapted to be installed in shallow water for surf fishing purposes, comprising a substantially horizontal support, at least three extensible leg assemblies pivotally connected to the support, surface contacting bearing means connected to the leg assemblies for stabilizing the platform, means for anchoring the support, and selectively operable means operatively connected to the support for embedding the anchoring means in a sandy surface formation below the water, said anchoring means including a downwardly converging screw element, said selectively operable means including an elongated actuating rod connected to the screw element, and handle means pivotally connected to the actuating rod above the water for threadedly inserting or withdrawing the screw element into or from the sandy surface formation.

10. The combination of claim 9 including flexible means suspending the anchoring means from the support.

* * * * *